(12) United States Patent
Tunks et al.

(10) Patent No.: US 12,535,248 B2
(45) Date of Patent: Jan. 27, 2026

(54) SYSTEMS AND METHODS FOR HEATING AND COOLING INFORMATION HANDLING SYSTEM WITH SERVER BLANK AND THERMOELECTRIC COOLER

(71) Applicant: Dell Products L.P., Round Rock, TX (US)

(72) Inventors: Eric Tunks, Austin, TX (US); Justin Broughton, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 364 days.

(21) Appl. No.: 18/313,778

(22) Filed: May 8, 2023

(65) Prior Publication Data

US 2024/0377110 A1 Nov. 14, 2024

(51) Int. Cl.
| F25B 21/00 | (2006.01) |
| F25B 21/04 | (2006.01) |
| G05B 19/4155 | (2006.01) |
| G05D 23/19 | (2006.01) |

(52) U.S. Cl.
CPC .......... *F25B 21/04* (2013.01); *G05B 19/4155* (2013.01); *G05D 23/1919* (2013.01); *G05B 2219/49216* (2013.01)

(58) Field of Classification Search
CPC ................ F25B 21/04; G05B 19/4155; G05B 2219/49216; G05D 23/1919
See application file for complete search history.

(56) References Cited

U.S. PATENT DOCUMENTS

| 2012/0111028 A1* | 5/2012 | Campbell ............... F25B 21/02 62/3.7 |
| 2014/0069111 A1* | 3/2014 | Campbell ............... F25B 21/02 29/890.035 |
| 2021/0373531 A1* | 12/2021 | Reddell .................. G06F 1/203 |

\* cited by examiner

*Primary Examiner* — Julio C. Gonzalez
(74) *Attorney, Agent, or Firm* — Jackson Walker L.L.P.

(57) ABSTRACT

A method may include operating a thermal control system in a plurality of modes comprising at least a heating mode causing electrical voltage to be applied to a thermoelectric cooler in a manner such that heat is transferred from the thermoelectric cooler to first heat-rejecting media to heat a flow of air through a first plenum and a cooling mode causing electrical voltage to be applied to the thermoelectric cooler in a manner such that heat is transferred from the first heat-rejecting media to the thermoelectric cooler to cool the flow of air through the first plenum.

15 Claims, 4 Drawing Sheets

SYSTEMS AND METHODS FOR HEATING AND COOLING INFORMATION HANDLING SYSTEM WITH SERVER BLANK AND THERMOELECTRIC COOLER

TECHNICAL FIELD

The present disclosure relates in general to information handling systems, and more particularly to cooling of information handling system components using a thermoelectric cooling apparatus, in conjunction with airflow-based cooling.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAN) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

A particular challenge in cooling information handling systems comes in the case of "edge computing," wherein an information handling system is located, often in a remote environment, in which its surrounding ambient temperature is not climate controlled, as might be the case of a cellular base station. In some instances, ambient temperatures may fluctuate considerably among seasons, meaning cooling requirements of an information handling system may change over time. For example, for hotter ambient temperatures, the information handling system may require significant cooling to maintain electronic components at desirable operating temperatures whereas for colder ambient temperatures, it may be required to heat electronic components of the information handling system to maintain their temperatures above minimum desired temperatures.

SUMMARY

In accordance with the teachings of the present disclosure, the disadvantages and problems associated with traditional approaches to heating and cooling information handling system components may be substantially reduced or eliminated.

In accordance with embodiments of the present disclosure, an information handling system may include a thermoelectric cooler, first heat-rejecting media thermally coupled to a first side of the thermoelectric cooler, second heat-rejecting media thermally coupled to a second side of the thermoelectric cooler, a first plenum in fluid communication with the first heat-rejecting media, the first plenum housing a plurality of electronic components, a second plenum in fluid communication with the second heat-rejecting media, a first air mover in fluid communication with the first plenum and configured to drive flow of air proximate to the first heat-rejecting media and through the first plenum, and a thermal control system communicatively coupled to the thermoelectric cooler and configured to operate in a plurality of modes comprising at least: (a) a heating mode, in which the thermal control system causes electrical voltage to be applied to the thermoelectric cooler in a manner such that heat is transferred from the thermoelectric cooler to the first heat-rejecting media to heat the flow of air through the first plenum; and (b) a cooling mode, in which the thermal control system causes electrical voltage to be applied to the thermoelectric cooler in a manner such that heat is transferred from the first heat-rejecting media to the thermoelectric cooler to cool the flow of air through the first plenum.

In accordance with these and other embodiments of the present disclosure, a method is provided for use in an information handling system having a thermoelectric cooler, first heat-rejecting media thermally coupled to a first side of the thermoelectric cooler, second heat-rejecting media thermally coupled to a second side of the thermoelectric cooler, a first plenum in fluid communication with the first heat-rejecting media wherein the first plenum houses a plurality of electronic components, a second plenum in fluid communication with the second heat-rejecting media, a first air mover in fluid communication with the first plenum and configured to drive flow of air proximate to the first heat-rejecting media and through the first plenum. The method may include operating in a plurality of modes comprising at least a heating mode causing electrical voltage to be applied to the thermoelectric cooler in a manner such that heat is transferred from the thermoelectric cooler to the first heat-rejecting media to heat the flow of air through the first plenum and a cooling mode causing electrical voltage to be applied to the thermoelectric cooler in a manner such that heat is transferred from the first heat-rejecting media to the thermoelectric cooler to cool the flow of air through the first plenum.

In accordance with these other embodiments of the present disclosure, an article of manufacture may include a non-transitory computer readable medium and computer-executable instructions carried on the computer readable medium, the instructions readable by a processor, the instructions, when read and executed, for causing the processor to, in an information handling system having a thermoelectric cooler, first heat-rejecting media thermally coupled to a first side of the thermoelectric cooler, second heat-rejecting media thermally coupled to a second side of the thermoelectric cooler, a first plenum in fluid communication with the first heat-rejecting media wherein the first plenum houses a plurality of electronic components, a second plenum in fluid communication with the second heat-rejecting media, a first air mover in fluid communication with the first plenum and configured to drive flow of air proximate to the first heat-rejecting media and through the first plenum: operate in a plurality of modes comprising at least a heating mode causing electrical voltage to be applied to the thermoelectric cooler in a manner such that heat is transferred from the thermoelectric cooler to the first heat-rejecting media to heat the flow of air through the first plenum and a cooling mode causing electrical voltage to be applied to the thermoelectric cooler in a manner such that heat is transferred from the first heat-rejecting media to the thermoelectric cooler to cool the flow of air through the first plenum.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 3B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
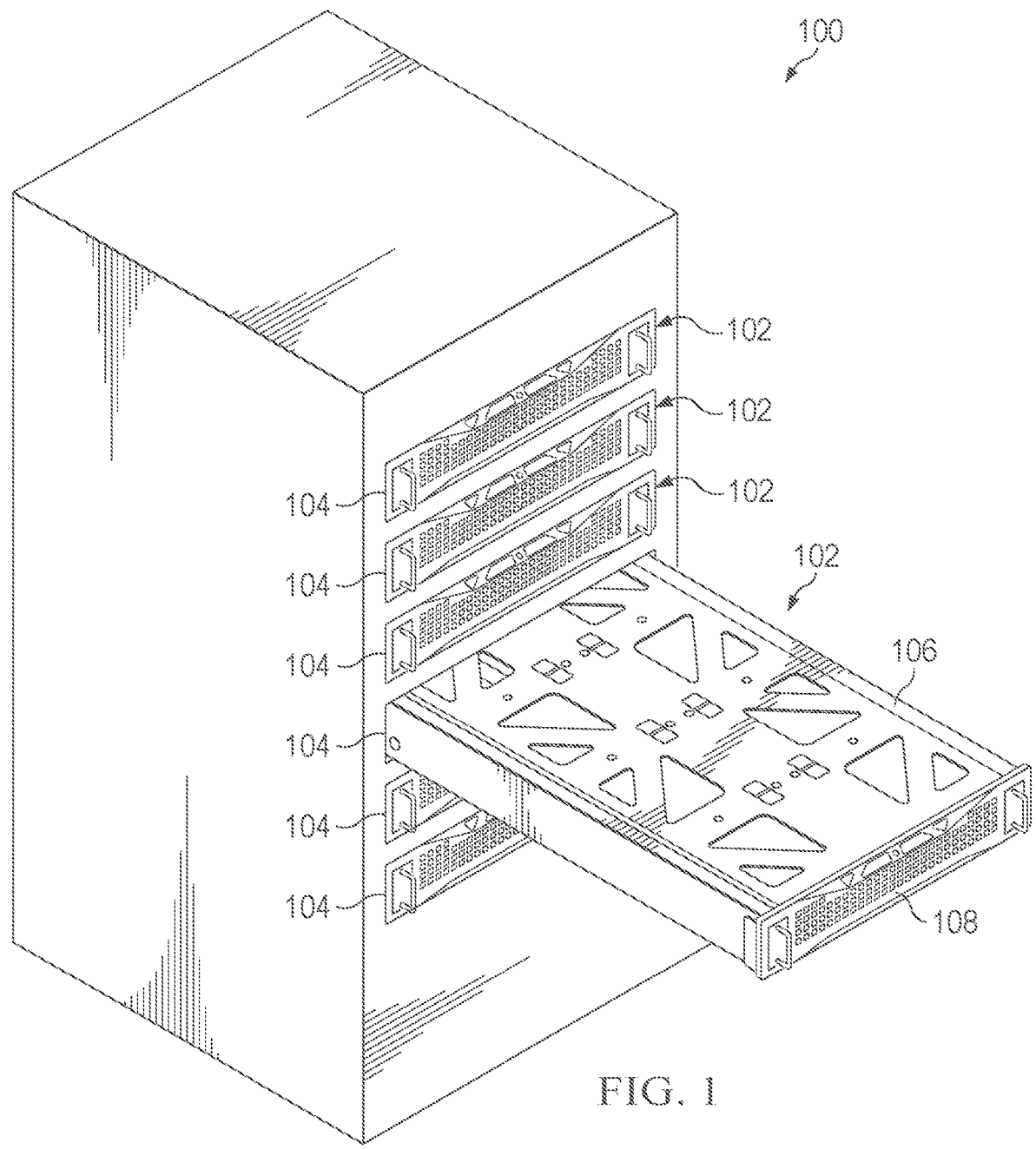
FIG. 1 illustrates a perspective view of selected components of a chassis for receiving modular information handling resources, in accordance with embodiments of the present disclosure.

FIG. 1 illustrates a perspective view of selected components of a chassis 100 for receiving modular information handling resources, in accordance with embodiments of the present disclosure. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include a plurality of slots 104, each configured to receive a modular information handling system 102. Further as shown in FIG. 1, each information handling system 102 may include a housing 106 for housing the various components of information handling system 102 and a bezel 108 coupled to the front of housing 106.

Figure 2:
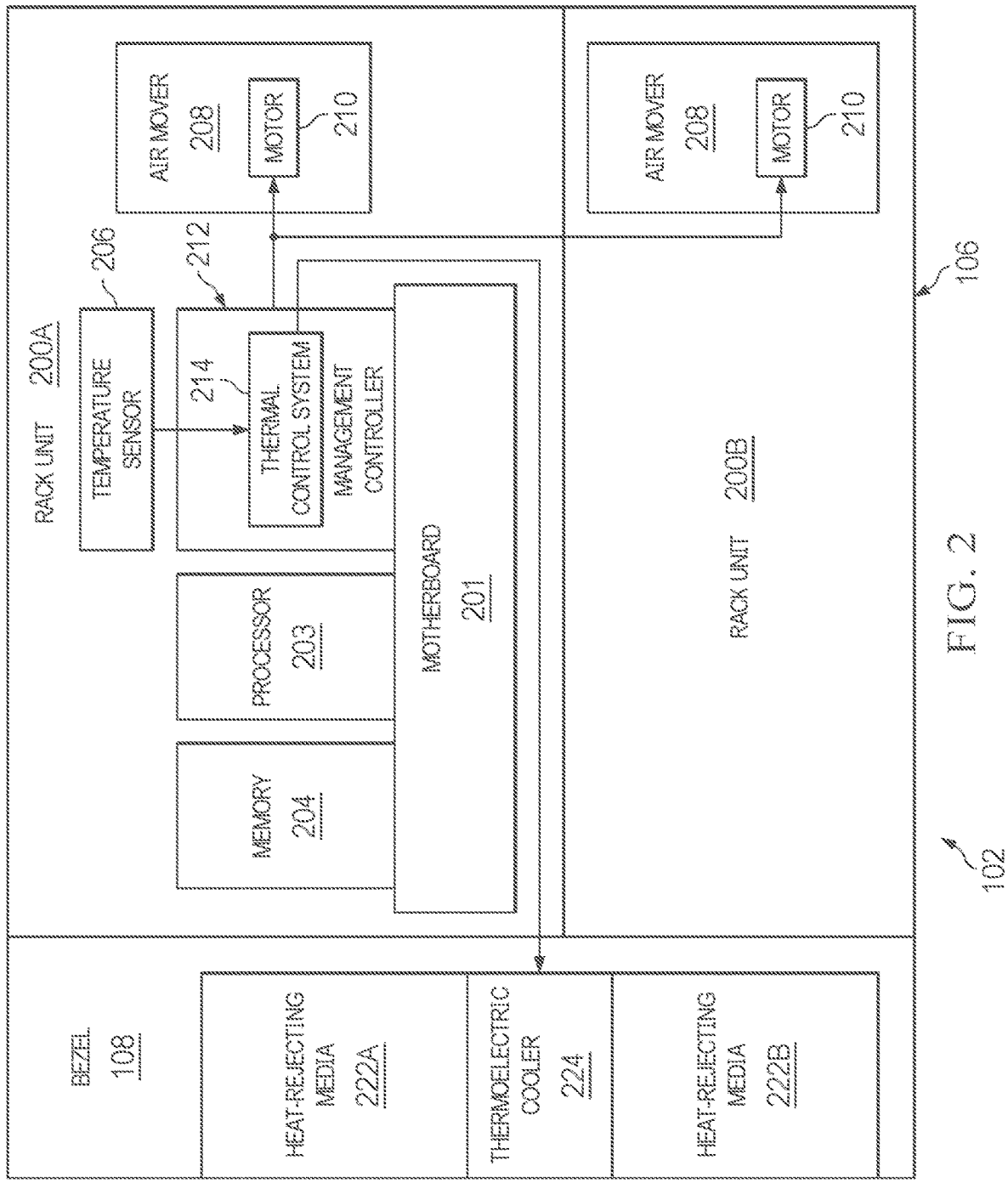
FIG. 2 illustrates a side elevation view of selected components of an example modular information handling system, in accordance with embodiments of the present disclosure.

FIG. 2 illustrates a side elevation view of selected components of an example modular information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data.

As shown in FIG. 2, information handling system 102 may be implemented as a 2 rack unit or "2U" server, with one rack unit 200A housing functional electronic server components of information handling system 102 and the other rack unit 200B comprising a substantially empty or "blank" plenum.

As shown in FIG. 2, rack unit 200A may house a motherboard 201, a processor 203 mechanically and electrically coupled to motherboard 201, a memory 204 mechanically and electrically coupled to motherboard 201, a management controller 212 mechanically and electrically coupled to motherboard 201, a temperature sensor 206 communicatively coupled to management controller 212, a plurality of air movers 208, heat-rejecting media 222 (e.g., heat-rejecting media 222A and 222B), and thermoelectric cooler 224.

Motherboard 201 may comprise a circuit board configured to provide structural support for one or more information handling resources of information handling system 102 and/or electrically couple one or more of such information handling resources to each other and/or to other electric or electronic components external to information handling system 102.

Processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of information handling system 102.

Memory 204 may be communicatively coupled to processor 203 and may comprise any system, device, or apparatus operable to retain program instructions or data for a period of time. Memory 204 may comprise random access memory (RAN), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 208 may include any mechanical or electro-mechanical system, apparatus, or device operable to move air and/or other gases in order to cool information handling resources of information handling system 102. In some embodiments, air mover 208 may comprise a fan (e.g., a rotating arrangement of vanes or blades which act on the air). In other embodiments, air mover 208 may comprise a blower (e.g., a centrifugal fan that employs rotating impellers to accelerate air received at its intake and change the direction of the airflow). In these and other embodiments, rotating and other moving components of air mover 208 may be driven by a motor 210. The rotational speed of motor 210 may be controlled by an air mover control signal communicated from thermal control system 214 of management controller 212. In operation, as described in greater detail below, air mover 208 may cool or heat information handling resources of information handling system 102 by drawing air into chassis 100 from outside chassis 100, expelling air from inside chassis 100 to the outside of chassis 100, and/or moving air across heat-rejecting media 222 to cool or warm air flowing proximate to such heat-rejecting media 222.

Management controller 212 may comprise any system, device, or apparatus configured to facilitate management and/or control of information handling system 102 and/or one or more of its component information handling resources. Management controller 212 may be configured to issue commands and/or other signals to manage and/or control information handling system 102 and/or its information handling resources. Management controller 212 may comprise a microprocessor, microcontroller, DSP, ASIC, field programmable gate array ("FPGA"), EEPROM, or any combination thereof. Management controller 212 also may be configured to provide out-of-band management facilities for management of information handling system 102. Such management may be made by management controller 212 even if information handling system 102 is powered off or powered to a standby state. In certain embodiments, management controller 212 may include or may be an integral part of a baseboard management controller (BMC), a remote access controller (e.g., a Dell Remote Access Controller or Integrated Dell Remote Access Controller), or an enclosure controller. In other embodiments, management controller 212 may include or may be an integral part of a chassis management controller (CMC).

As shown in FIG. 2, management controller 212 may include a thermal control system 214. Thermal control system 214 may include any system, device, or apparatus configured to receive one or more signals indicative of one or more temperatures within information handling system 102 (e.g., one or more signals from one or more temperature sensors 206), and based on such signals, calculate an air mover driving signal to maintain an appropriate level of cooling/heating, increase cooling/heating, or decrease cooling/heating, as appropriate, and communicate such air mover driving signal to air movers 208. In addition to thermal-based control of speeds of air movers 208, thermal control system 214 may further be configured to regulate thermoelectric cooler 224 based on a temperature sensed by temperature sensor 206, such regulation including, without limitation, turning thermoelectric cooler 224 on or off, regulating power consumption of thermoelectric cooler 224, and/or regulating a temperature of thermoelectric cooler 224.

Temperature sensor 206 may be any system, device, or apparatus (e.g., a thermometer, thermistor, etc.) configured to communicate a signal to management controller 212 or another controller indicative of a temperature within information handling system 102. In many embodiments, information handling system 102 may comprise a plurality of temperature sensors 206, wherein each temperature sensor 206 detects a temperature of a particular component and/or location within information handling system 102. For example, in some embodiments a temperature sensor 206 may be located within, upon, or sufficiently proximate to motherboard 201 in order that any temperature measured by temperature sensor 206 is indicative of a temperature proximate to motherboard 201 and/or components mounted thereon.

Heat-rejecting media 222 may include any system, device, or apparatus configured to transfer heat from an information handling resource (e.g., thermoelectric cooler 224, as shown in FIG. 2), into air flowing proximate to such heat-rejecting media 222 or vice versa, thus increasing or decreasing a temperature of such air. For example, heat-rejecting media 222 may include a solid thermally coupled to the information handling resource (e.g., heatpipe, heat spreader, heatsink, finstack, etc.) such that heat or coldness generated by thermoelectric cooler 224 is transferred from thermoelectric cooler 224 into air surrounding heat-rejecting media 222 and driven by an air mover 208 or such that heat present in air surrounding heat-rejecting media 222 and driven by an air mover 208 is transferred from the air to thermoelectric cooler 224.

Thermoelectric cooler 224 may be thermally coupled to heat-rejecting media 222. Thermoelectric cooler 224 may comprise any suitable system, device, or apparatus configured to, in response to an electrical voltage applied to it, transfer heat from one side (the "cold side") of thermoelectric cooler 224 to another side (the "hot side") of thermoelectric cooler 224 in accordance with the thermoelectric effect (which may also be known as the Peltier effect, among other names). Thermoelectric cooler 224 may also be configured such that changing the polarity of the electrical voltage applied to thermoelectric cooler 224 may reverse the direction of heat transfer through thermoelectric cooler 224 (e.g., changing voltage polarity may change the cold side to the hot side and change the hot side to the cold side). As shown in the figures, thermoelectric cooler 224 and heat-rejecting media 222A may be arranged such that a first side of thermoelectric cooler 224 may be thermally coupled to a portion of heat-rejecting media 222A that is within an airflow path of air flowing from an air mover 208 within rack unit 200A, such that thermoelectric cooler 224 cools or heats such portion of heat-rejecting media 222A, in turn cooling or heating the airflow passing through such portion of heat-rejecting media 222A, depending on a polarity of the electrical voltage applied to thermoelectric cooler 224. Similarly, thermoelectric cooler 224 and heat-rejecting media 222B may be arranged such that a second side of thermoelectric cooler 224 may be thermally coupled to a portion of heat-rejecting media 222B that is within an airflow path of air flowing from an air mover 208 within rack unit 200B, such that thermoelectric cooler 224 cools or heats such portion of heat-rejecting media 222B, in turn cooling or heating the airflow passing through such portion of heat-rejecting media 222B, depending on a polarity of the electrical voltage applied to thermoelectric cooler 224.

In addition to motherboard 201, processor 203, memory 204, management controller 212, temperature sensor 206, air movers 208, heat-rejecting media 222, and thermoelectric cooler 224, information handling system 102 may include one or more other information handling resources.

Figure 3A:
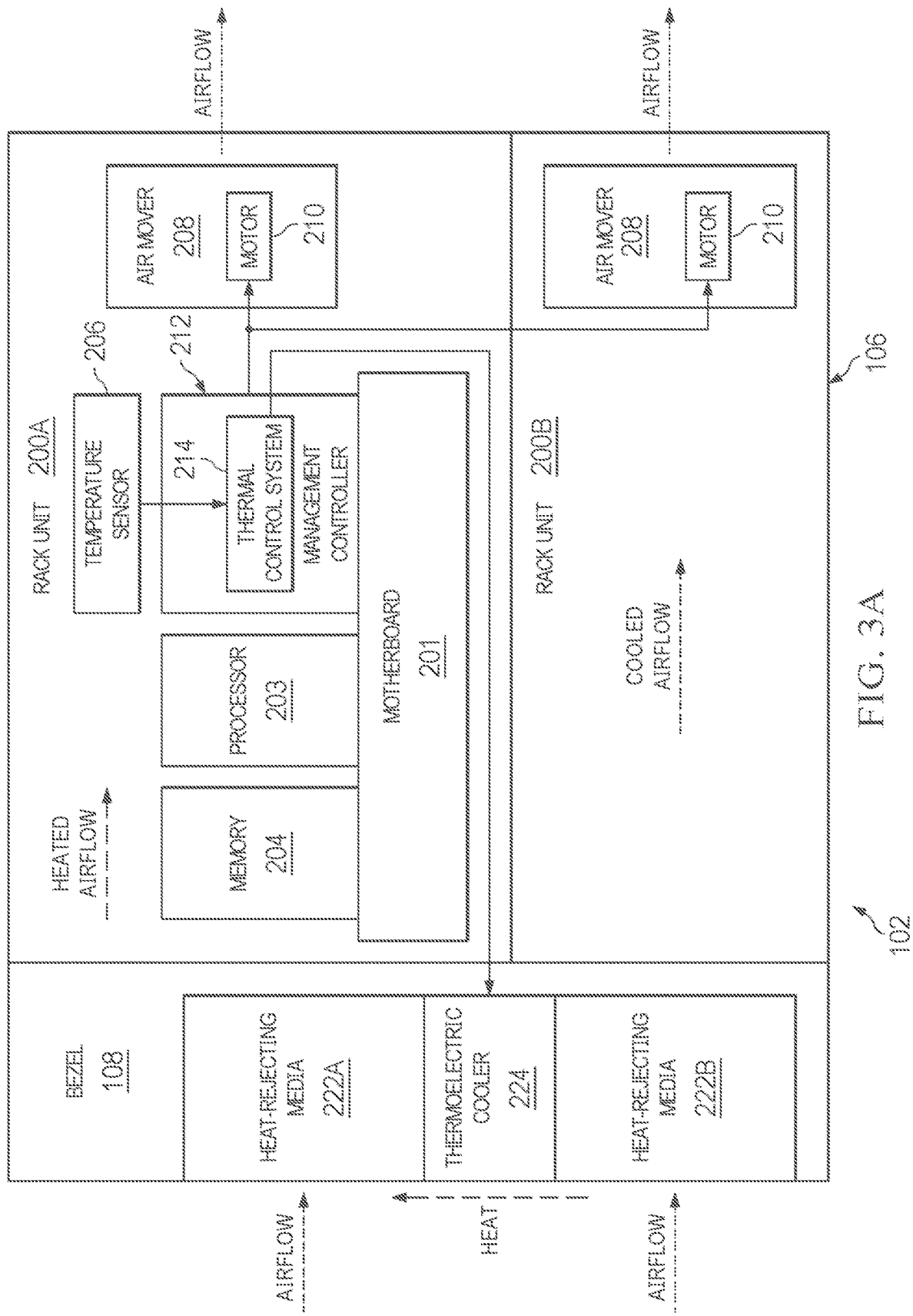
FIG. 3A illustrates the side elevation view of FIG. 2, illustrating the transfer of heat and flow of air in a heating mode of the example information handling system, in accordance with embodiments of the present disclosure.

FIG. 3A illustrates the side elevation view of information handling system 102 shown in FIG. 2, illustrating the transfer of heat and flow of air in a heating mode of information handling system 102, in accordance with embodiments of the present disclosure. The heating mode may occur when a temperature measured by temperature sensor 206 is below a cold threshold temperature, thus indicating that one or more components housed within rack unit 200A may be at temperatures below that at which optimal functionality may occur. In response to such temperature condition, thermal control system 214 may apply a voltage to thermoelectric cooler 224 such that heat is transferred from heat-rejecting media 222B to heat-rejecting media 222A, thus heating air flowing over heat-rejecting media 222A, which in turn may increase the temperature within rack unit 200A. Such operation in the heating mode may continue until the temperature measured by temperature sensor 206 reaches the cold threshold temperature (plus any hysteresis offset).

Figure 3B:
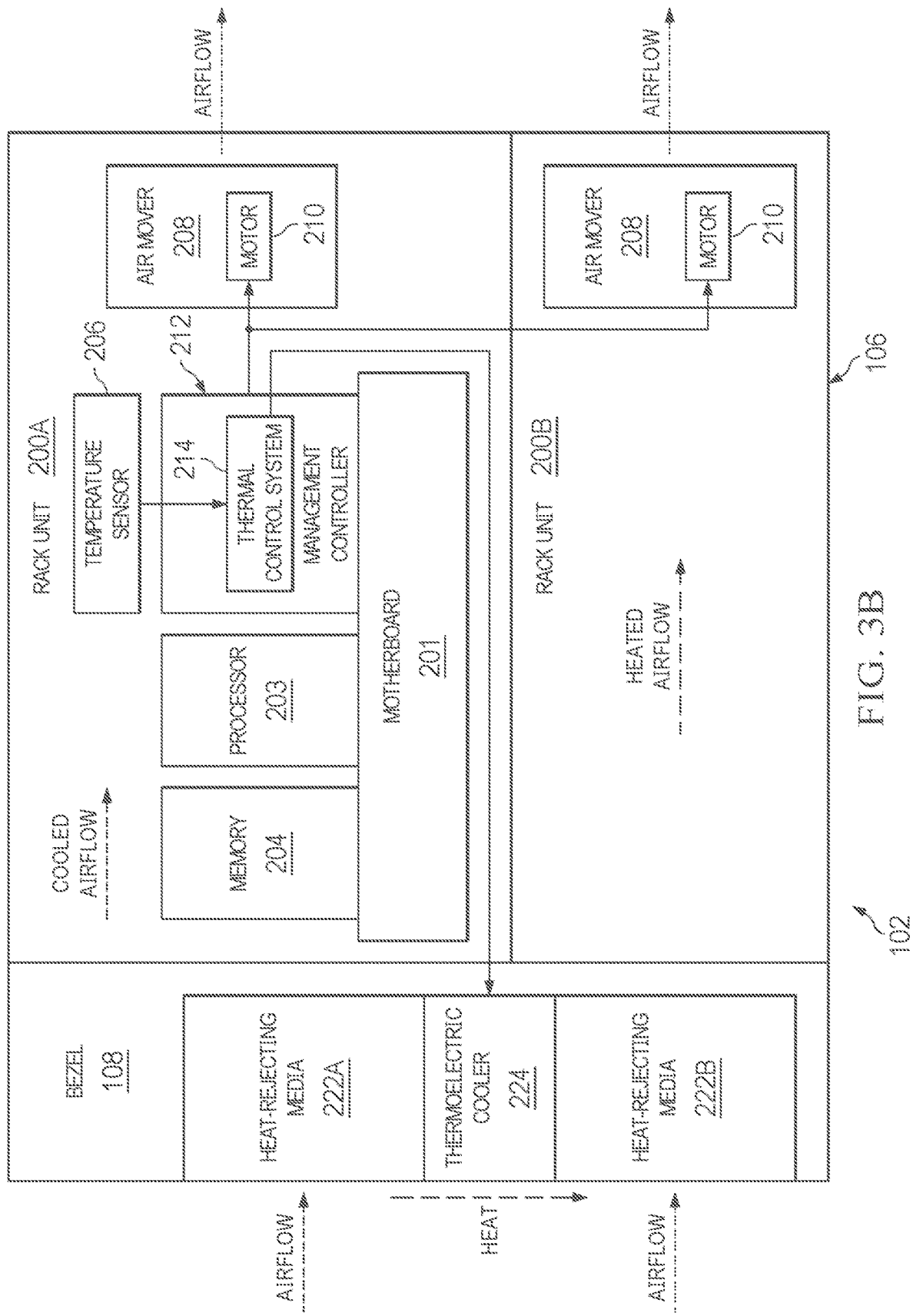
FIG. 3B illustrates the side elevation view of FIG. 2, illustrating the transfer of heat and flow of air in a cooling mode of the example information handling system, in accordance with embodiments of the present disclosure.

FIG. 3B illustrates the side elevation view of information handling system 102 shown in FIG. 2, illustrating the transfer of heat and flow of air in a cooling mode of information handling system 102, in accordance with embodiments of the present disclosure. The cooling mode may occur when a temperature measured by temperature sensor 206 is above a hot threshold temperature, thus indicating that one or more components housed within rack unit 200A may be at temperatures above that at which optimal functionality may occur. In response to such temperature condition, thermal control system 214 may apply a voltage to thermoelectric cooler 224 such that heat is transferred from heat-rejecting media 222A to heat-rejecting media 222B, thus cooling air flowing over heat-rejecting media 222A, which in turn may decrease the temperature within rack unit 200A. Such operation in the cooling mode may continue until the temperature measured by temperature sensor 206 falls below the hot threshold temperature (minus any hysteresis offset).

Although the foregoing contemplates that rack units 200A and 200B respectively form a first plenum for electronic components and a second plenum that is substantially blank, the creation of such plenums may be accomplished in any suitable manner. For example, in some embodiments, a slot 104 of chassis 100 may serve as the first plenum analogous to rack unit 200A and an adjacent slot 104 of chassis 100 may serve as the second plenum analogous to rack unit 200B.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a thermoelectric cooler;
   first heat-rejecting media thermally coupled to a first side of the thermoelectric cooler;
   second heat-rejecting media thermally coupled to a second side of the thermoelectric cooler;
   a first plenum in fluid communication with the first heat-rejecting media, the first plenum housing a plurality of electronic components;
   a second plenum in fluid communication with the second heat-rejecting media;
   a first air mover in fluid communication with the first plenum and configured to drive flow of air proximate to the first heat-rejecting media and through the first plenum;
   a second air mover in fluid communication with the second plenum and configured to drive flow of air proximate to the second heat-rejecting media and through the second plenum; and
   a thermal control system communicatively coupled to the thermoelectric cooler and configured to operate in a plurality of modes comprising at least:
      a heating mode, in which the thermal control system causes electrical voltage to be applied to the thermoelectric cooler in a manner such that heat is transferred from the thermoelectric cooler to the first heat-rejecting media to heat the flow of air through the first plenum; and
      a cooling mode, in which the thermal control system causes electrical voltage to be applied to the thermoelectric cooler in a manner such that heat is transferred from the first heat-rejecting media to the thermoelectric cooler to cool the flow of air through the first plenum.

2. The information handling system of claim 1, wherein:
   the first plenum comprises a first rack unit of the information handling system; and
   the second plenum comprises a second rack unit of the information handling system adjacent to the first rack unit.

3. The information handling system of claim 1, wherein:
   the first plenum comprises a first slot of a chassis for housing a plurality of information handling systems; and
   the second plenum comprises a second slot of the chassis adjacent to the first slot.

4. The information handling system of claim 1, further comprising a temperature sensor communicatively coupled to the thermal control system and configured to communicate a temperature signal to the thermal control system indicative of a temperature associated with the first plenum;
   wherein the thermal control system is further configured to operate in the heating mode when the temperature is below a threshold temperature.

5. The information handling system of claim 1, further comprising a temperature sensor communicatively coupled to the thermal control system and configured to communicate a temperature signal to the thermal control system indicative of a temperature associated with the first plenum;
   wherein the thermal control system is further configured to operate in the cooling mode when the temperature is above a threshold temperature.

6. A method, in an information handling system having a thermoelectric cooler, first heat-rejecting media thermally coupled to a first side of the thermoelectric cooler, second heat-rejecting media thermally coupled to a second side of the thermoelectric cooler, a first plenum in fluid communication with the first heat-rejecting media wherein the first plenum houses a plurality of electronic components, a second plenum in fluid communication with the second heat-rejecting media, a first air mover in fluid communication with the first plenum and configured to drive flow of air proximate to the first heat-rejecting media and through the first plenum, and a second air mover in fluid communication with the second plenum and configured to drive flow of air proximate to the second heat-rejecting media and through the second plenum, the method comprising:
   operating in a plurality of modes comprising at least:
      a heating mode causing electrical voltage to be applied to the thermoelectric cooler in a manner such that heat is transferred from the thermoelectric cooler to the first heat-rejecting media to heat the flow of air through the first plenum; and
      a cooling mode causing electrical voltage to be applied to the thermoelectric cooler in a manner such that heat is transferred from the first heat-rejecting media to the thermoelectric cooler to cool the flow of air through the first plenum; and
   driving flow of air proximate to the second heat-rejecting media and through the second plenum.

7. The method of claim 6, wherein:
   the first plenum comprises a first rack unit of the information handling system; and
   the second plenum comprises a second rack unit of the information handling system adjacent to the first rack unit.

8. The method of claim 6, wherein:
   the first plenum comprises a first slot of a chassis for housing a plurality of information handling systems; and
   the second plenum comprises a second slot of the chassis adjacent to the first slot.

9. The method of claim 6, further comprising operating in the heating mode when a temperature associated with the first plenum is below a threshold temperature.

10. The method of claim 6, further comprising operating in the cooling mode when a temperature associated with the first plenum is above a threshold temperature.

11. An article of manufacture, comprising;
    a non-transitory computer readable medium; and
    computer-executable instructions carried on the computer readable medium, the instructions readable by a processor, the instructions, when read and executed, for causing the processor to, in an information handling system having a thermoelectric cooler, first heat-rejecting media thermally coupled to a first side of the thermoelectric cooler, second heat-rejecting media thermally coupled to a second side of the thermoelectric cooler, a first plenum in fluid communication with the first heat-rejecting media wherein the first plenum houses a plurality of electronic components, a second plenum in fluid communication with the second heat-rejecting media, a first air mover in fluid communication with the first plenum and configured to drive flow of air proximate to the first heat-rejecting media and through the first plenum, and a second air mover in fluid communication with the second plenum and configured to drive flow of air proximate to the second heat-rejecting media and through the second plenum:

operate in a plurality of modes comprising at least:
a heating mode causing electrical voltage to be applied to the thermoelectric cooler in a manner such that heat is transferred from the thermoelectric cooler to the first heat-rejecting media to heat the flow of air through the first plenum; and
a cooling mode causing electrical voltage to be applied to the thermoelectric cooler in a manner such that heat is transferred from the first heat-rejecting media to the thermoelectric cooler to cool the flow of air through the first plenum.

12. The article of claim 11, wherein:
the first plenum comprises a first rack unit of the information handling system; and
the second plenum comprises a second rack unit of the information handling system adjacent to the first rack unit.

13. The article of claim 11, wherein:
the first plenum comprises a first slot of a chassis for housing a plurality of information handling systems; and
the second plenum comprises a second slot of the chassis adjacent to the first slot.

14. The article of claim 11, the instructions for further causing operation in the heating mode when a temperature associated with the first plenum is below a threshold temperature.

15. The article of claim 11, the instructions for further causing operation in the cooling mode when a temperature associated with the first plenum is above a threshold temperature.

* * * * *